United States Patent

[11] 3,595,987

[72] Inventor Petro Vlahos
Tarzana, Calif.
[21] Appl. No. 801,083
[22] Filed Feb. 20, 1969
[45] Patented July 27, 1971
[73] Assignee The Association of Motion Picture & Television Producers Inc.
Hollywood, Calif.

[54] ELECTRONIC COMPOSITE PHOTOGRAPHY
16 Claims, 2 Drawing Figs.

[52] U.S. Cl. .......... 178/5.2 R, 178/5.4 CR, 178/DIG. 6, 352/131
[51] Int. Cl. .......... H04n 5/22
[50] Field of Search .......... 178/6 ST, 6 DIG. 6, 5.2, 5.4, 6.7 R, 5.4 CR, 5.2 D; 352/131; 355/4, 5, 7

[56] References Cited

UNITED STATES PATENTS

| | | | |
|---|---|---|---|
| 2,307,661 | 1/1943 | Batchelor | 178/DIG. 6 |
| 2,615,088 | 10/1952 | Gordon | 178/DIG. 6 |
| 3,296,367 | 1/1967 | Cassagne | 178/DIG. 6 |

FOREIGN PATENTS

| | | | |
|---|---|---|---|
| 720,182 | 12/1954 | Great Britain | 178/DIG. 6 |
| 1,172,540 | 6/1964 | Germany | 178/DIG. 6 |

*Primary Examiner*—Robert L. Griffin
*Assistant Examiner*—Joseph A. Orsino, Jr.
*Attorney*—Charlton M. Lewis

ABSTRACT: Separate foreground and background scenes are combined to form a composite color television picture or color motion picture film by electronic manipulation of respective sets of color component video signals, one set representing the foreground scene with an illuminated backing, typically blue, and the other set representing the background scene. Blue from the foreground backing is eliminated from the composite picture by electronically limiting the foreground blue signal to a selected function of the green signal. Portions of the background that are covered by foreground objects are eliminated in the composite picture by gating the background video signals under control of color discriminating circuitry which compares the foreground blue and green (or red) color component signals. Both the discriminating circuits and the gating circuits act proportionally, so that partially transparent objects of the foreground are correctly distinguished, making the background scene partially visible through such objects in the composite picture.

PATENTED JUL 27 1971 3,595,987

Figure 1:
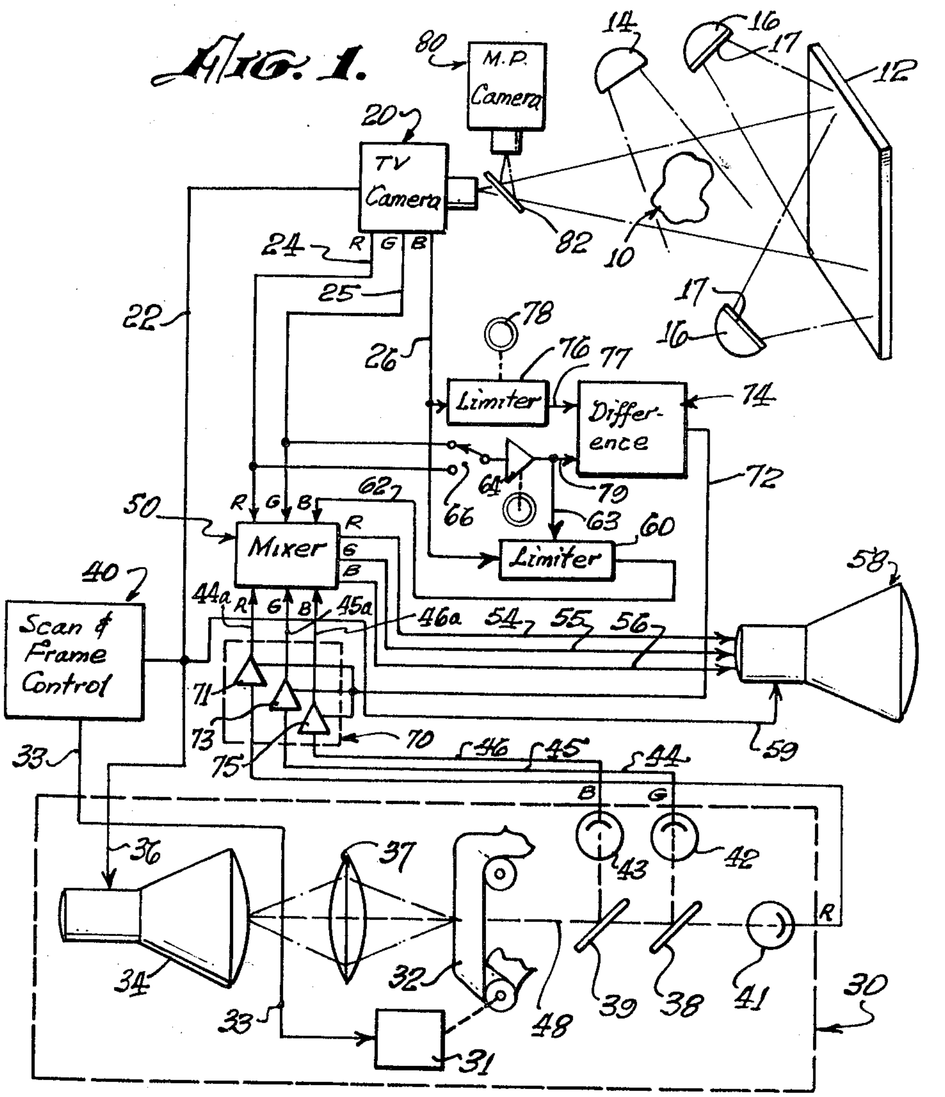

INVENTOR.
PETRO VLAHOS,
By Charlton M. Lewis

ELECTRONIC COMPOSITE PHOTOGRAPHY

This invention has to do with electronic methods and apparatus by which a foreground scene and a background scene may be separately recorded and then combined to form a composite picture in which objects of the foreground appear superposed over objects of the background.

For convenience of description the abbreviations BG and FIG. will be used in referring to "background" and "-foreground."

A particular object of the invention is to permit objects of both FG and BG scenes to be portrayed in full color, with special attention to accuracy of reproduction of such delicate colors as normally occur in flesh tones and eyes.

A further object of the invention is to permit BG objects to be seen to a realistic extent through objects of the FG that are partially or wholly transparent, and to achieve a normal degree of seethrough for such special situations as FG objects that are out of focus or blurred by rapid motion.

Whereas the invention is particularly useful in connection with television or motion picture scenes involving movement, and in connection with color reproduction, many aspects of the invention are useful for still pictures and for producing composite pictures in black and white or in partial color.

In purely photographic processes of composite photography, areas of the BG scene that are occupied by FG objects are blocked out by printing the BG through a specially prepared matte, which is referred to as a traveling matte when motion pictures are involved. In the electronic system no such physical matte is employed, but a suitable alternative capability must be provided by which the system can recognize for every spot of the picture whether the video signal should correspond to the FG or BG component.

For that purpose, the present invention utilizes the conventional procedure of arranging the objects of the FG scene before a backing of a distinctive color. FG objects are then distinguished from the colored backing by suitable comparison of the electronic color component video signals, such as are developed directly by a television color camera, for example. Those color component signals normally correspond to the colors blue, green and red, characterized typically by the respective wavelength regions of 400 to 500, 500 to 600 and 600 to 700 millimicrons, and the color component signals then represent directly the relative blue, green and red light values of the scene. Such signals for the FG and BG scenes may be developed directly from the natural scenes, as by use of television cameras or equivalent apparatus. Alternatively, the video color component signals for one or both of the picture components may be derived from a previously prepared record of the FG or BG scene. Such a record may comprise a photographic record such as a conventional motion picture film, or may comprise a video tape in which the color information has the form of a chrominance signal.

The color of the illuminated backing for the FG scene is typically restricted to one of the wavelength regions represented by the color component signals. In theory, and under special circumstances in practice, any of those component colors may be used as backing for the FG scene. However, blue is ordinarily the most practical backing color. That is because the selected backing color should not ordinarily be used in pure form in the FG scene itself; and since a saturated blue is rarely found in nature, its avoidance in the FG scene does not impose a serious limitation. Accordingly, for the sake of clarity the present description will be based on the use of blue as backing, with the understanding that other colors may be preferred under special circumstances.

The present invention provides discrimination circuitry that is typically responsive to the blue and green components of the light received from the foreground scene and that develops a control signal representing the extent to which that light was derived from the blue backing. That control signal is then employed to control the relative proportions in which the foreground and background video signals are mixed to produce the composite picture.

An important feature of the invention is that the resulting switching or gating action is preferably not a simple on-off action, but is proportional in its nature, and is thus capable of reproducing correctly partially transparent areas of the FG scene through which the BG scene is partially visible. Such proportional gating of the picture components is made possible by utilizing discriminating circuits responsive to a plurality of color component video signals, rather than attempting to distinguish between FG and BG areas of the picture on the basis of the single chrominance signal, as has been previously proposed.

The video signals representing the BG scene are proportionally gated under control of a signal that typically represents the excess of the blue light over a specified function of the green light received from the FG scene. That gating reduces the BG signals to zero when the FG blue light does not exceed that function and transmits the full BG signals when the FG blue has its maximum value, corresponding to an area of the illuminated blue backing. The gating of the FG color signals typically acts only on the blue signal, and is essentially a clipping action, limiting the blue FG signal to a value no larger than a specified function of the green FG signal.

A composite picture produced by the present invention may have the form of a video signal suitable for television broadcasting or for video tape recording, or may be recorded on photographic film such as a motion picture film suitable for conventional optical projection. Such production of composite motion picture films by electronic procedures is practicable only if the process is capable of correct reproduction of partially transparent areas of the FG scene. Such areas occur in motion pictures not only from presence of inherently transparent objects, such as glassware, smoke and wisps of hair, but also from edges of opaque objects that are blurred by movement. Since the present process can handle such areas properly, it can take the place of known photographic processes for producing composite motion pictures from separate FG and BG scenes.

When so used for motion picture composite photography, the present invention permits greater speed of operation and far greater flexibility of control than the previously known photographic processes. Whereas purely photographic traveling matte processes require more than one day to produce a composite film, the present electronic process can produce a completed film for viewing the next day.

The present invention further permits a motion picture director to observe on a television monitor a composite picture of the FG and BG scenes during photography of the FG scene. For example, the FG scene that is before the motion picture camera can be picked up also by a television camera and combined electronically with a BG scene that is introduced from an existing film. The composite picture on the monitor then permits the director to locate the FG action and lighting to match elements in the BG scene.

A full understanding of the invention, and of its further objects and advantages, will be had from the following description of certain illustrative manners in which it may be carried out. The particulars of that description, and of the accompanying drawings which form a part of it, are intended only as illustration and not as a limitation upon its scope, which is defined in the appended claims.

Figure 2:
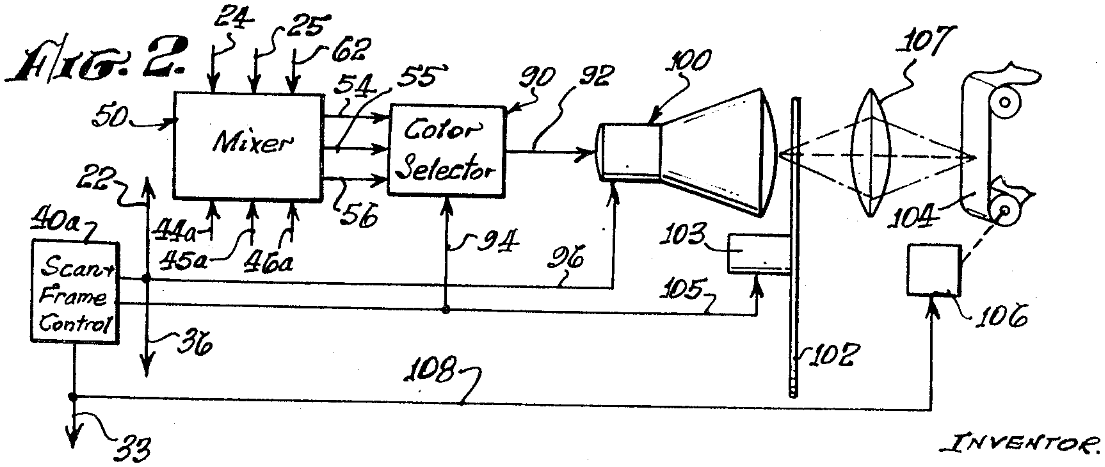

In the drawings:

FIG. 1 is a schematic block diagram representing an illustrative system for carrying out the invention; and FIG. 2 is a schematic block diagram corresponding to a portion of FIG. 1 and representing a modification.

As illustratively represented in FIG. 1, the FG scene 10 is arranged before the illuminated backing 12 and is recorded by the television camera represented at 20. The FG scene is typically illuminated in conventional manner, as by the lamp 14. That lamp requires no special filtering, and may be of any type called for by the color reproduction process that is employed.

Backing 12 may be illuminated in many different ways, depending upon its nature. If the backing material is a painted canvas having a reflectivity limited to the blue region of the spectrum, it may be illuminated by the same lamps as the FG objects, though additional light is usually desirable. If the backing is a white opaque surface it may be placed out of the range of FG lamps 14 and be lighted by special lamps, such as those shown at 16, which are provided with the blue filters 17 or otherwise constructed to emit only blue light. Alternatively, the backing may be of translucent material and be illuminated from the rear, with the color limited to blue by use of either blue material or blue lamps or both.

Television camera 20 may be of any conventional type which scans the FG scene and its backing under control of a synchronizing signal received over the line 22 from the control unit 40, and which produces on the lines 24, 25 and 26 respective video signals corresponding to the red, green and blue color components of the scene, designated R, G and B.

As represented in FIG. 1, the BG scene is illustratively provided in the form of a motion picture film 32. That film is advanced intermittently by known mechanism indicated at 31 in response to suitably timed signals received over the line 33 from control unit 40. Each frame of film 32 is scanned in synchronism with the FG scanning action of camera 20, as by the flying spot scanner represented in simplified and schematic form at 30. Flying spot scanner 30 typically comprises the cathode ray tube (CRT) 34 with deflection means, not explicitly shown, for causing a spot of light to scan an area on the face of the tube under control of a synchronizing signal received over the line 36. That signal is developed by control unit 40 in suitable time relation to the similar scanning control signal delivered to camera 20. Those two control signals are represented in FIG. 1 as being supplied by a common line to emphasize their common time relation, but in practice distinct signals may be developed and employed for control of different scanning devices. The "flying spot" on the face of CRT 34 is focused onto a frame of film 32 by the lens 37, so that the transmitted light 48 is modified in accordance with the color and density of the BG scene at the rapidly shifting illuminated spot. The transmitted light 48 is separated in known manner by the dichroic mirrors 38 and 39 into red, green and blue color components, which are directed to the respective light sensor 41, 42 and 43, represented as photocells. The respective photocell outputs on the lines 44, 45 and 46 are video signals representing the red, green and blue color components of the BG scene and designated R, G and B. Those signals correspond directly to the FG component video signals on lines 24, 25 and 26, already described. That is, at any instant the FG component video signals and the BG component video signals are derived from directly corresponding points of the FG scene and of the BG scene, respectively.

The color component signals for the FG and BG scenes are mixed in the mixer 50, to produce on the output lines 54, 55 and 56 color component signals for the desired composite picture. The resulting composite picture can then be displayed, for example, by means of a three color cathode ray tube 58 in which the beam scanning is synchronized with that in camera 20 and CRT 34 by means of suitable synchronizing signals supplied via the line 59 from control unit 40. In accordance with the present invention, the separate FG and BG color component signals are suitably modified in intensity, before being supplied to mixer 50, in such a way as to make each point of the resulting composite picture correspond properly to either the FG or the BG scene, or to a properly weighted combination of both. That signal modification thus performs fundamentally a selection function, and will be referred to for convenience as a "gating action." However, the present gating action is preferably quite different from the crude switching that is sometimes associated with that terms. The gating action of the present invention is carried out under control of color discriminating circuits which operate in response to color component signals for the FG scene only.

As illustratively shown in FIG. 1, the red and green component signals for the FG scene are transmitted directly via the respective lines 24 and 25 to mixer 20. The blue component signal is modified by circuitry indicated schematically at 60, which receives the blue signal from line 26 and delivers the modified blue signal via the line 62 to mixer 50. Circuitry 60 acts under control of an input control signal, received via the line 63, which may be derived via the amplifier 64 from either the green or the red FG signal, according to the position of the switch 66. For normal FG scenes switch 66 is ordinarily maintained in the position shown, supplying the green component signal from line 25 for control of circuit 60, and that position will be assumed for clarity of description. The function of circuit 60 is then essentially to apply the green component signal as a floating peak limiter or clipper upon the blue signal. If the blue signal is equal to or less than the limiting threshold, it is transmitted without modification to output line 62 and mixer 50.

The limiting threshold thus imposed by circuit 60 upon the FG blue signal may directly equal the green signal. However, it is ordinarily preferred to introduce biasing circuitry such that the permitted maximum value of the blue signal increases somewhat faster than the green control signal, typically corresponding approximately to the product of the green signal and a factor that exceeds unity by a selected fraction, typically of the order of 20 percent. Such a bias may be introduced in any suitable manner, as by the amplifier 64 which has a gain M that is preferably variable, as indicated by the control 65. Variation of M from unity to about 1.5 is sufficient for most scenes. Limiter 60 then limits the blue FG signal reaching mixer 50 to a maximum value equal to the green signal multiplied by M.

A primary result of that limitation of the FG blue signal is to prevent any contribution to mixer 50 from the FG scene when the scanning action of camera 20 is confined to the blue backing 12. When camera 20 is receiving only blue light, the green and red component signals are necessarily zero. Though the blue signal on line 26 is large, it is reduced to zero by the described limiting action of circuit 60.

On the other hand, when camera 20 is scanning a FG object, the described limitation of the blue component ordinarily has no effect upon the reproduction of normally occurring FG colors. The exceptional effects that do occur, especially at semitransparent areas of the FG scene, are discussed more fully below.

The gating of the BG scene is carried out in FIG. 1 by circuitry indicated schematically at 70, acting under control of a control signal $E_c$ supplied via the line 72. That control signal is developed by color discriminating circuitry represented at 74, which receives the blue FG signal from line 26 via the limiter 76 and the line 77, and receives a reference signal from the line 79. That reference signal is typically the same as the control signal for limiter 60, already described, being derived via amplifier 64 from either the green or the red FG signal, depending upon the position of switch 66.

Circuit 74 is typically a different amplifier, and its output signal $E_c$ on line 72 represents essentially the excess of the blue FG signal the output is zero. The input blue signal, however, is preferably first limited by variable limiter 76 to a value that will be denoted by $B_o$ and that is adjustable at 78. $B_o$ is made no larger than the value corresponding the least brightly illuminated portion of backing 12. It is then immaterial whether the backing is lighted with strict uniformity, so long as all areas received at least the selected threshold intensity. As a matter of fact, $B_o$ is ordinarily set at the level corresponding to the maximum illumination of the FG objects, for reasons that will appear.

Whenever camera 20 or its equivalent is scanning the backing, the reference signal on line 79 is essentially zero. Control signal $E_c$ then represents the full value of the input blue signal, corresponding to the threshold or minimum illumination of backing 12. If camera 20 scans a FG object, control signal $E_c$ is ordinarily sharply reduced for two reasons.

First, the blue content of the FG object is normally far less than the described threshold illumination of the blue backing. Secondly, most FG objects have an appreciable green content, so that the reference signal on line 79 is appreciable. Subtraction of that reference signal from the input blue signal further reduces the value of $E_c$. In fact, for all ordinary opaque FG objects the green content (especially after amplification at 64) equals or exceeds the blue content, so that the output control signal is zero. Special cases, including transparent or partially transparent FG objects, are discussed more fully below.

Gating circuit 70 for the BG scene comprises essentially three variable gain amplifiers 71, 73 and 75 for the respective color components. Each amplifier receives one of the BG color component signals on the line 44, 45 or 46 and delivers the modified signal to mixer 50 via the corresponding line 44*a*, 45*a* or 46*a*. Each amplifier also receives the control signal $E_c$ from line 72 and responds by amplifying its BG color component signal with a gain substantially proportional to $E_c$. Thus, when $E_c$ is zero the amplifiers of circuit 70 act as open switches, and mixer 50 receives no input corresponding to the BG scene. On the other hand, when the control signal has its maximum value, corresponding to the described threshold illumination of backing 10, the BG signals are transmitted with full normal amplitude to mixer 50. For intermediate values of the control signal, corresponding primarily to partially transparent objects of the FG scene, the BG color component signals are uniformly attenuated and contribute to mixer 50 only an appropriate fraction of the BG brightness sensed by BG scanner 30.

In describing more fully the operation of the system of FIG. 1, it will first be assumed that the colors blue and magenta do not occur in the objects of the FG scene. Magenta is defined as blue plus red, with little or no green content. With that assumption all FG colors have a blue content that is equal to or less than the green content. Thus, for all grey scale objects from black to white the blue and green contents are equal. The color cyan includes equal amounts of blue and green with little or no red. In the case of red, yellow, green, gold, copper and flesh tones the blue content is less than the green content.

For all such colors, biasing amplifier 64 can be set to a gain of unity. Limiter 60 then transmits to mixer 50 only so much of the input blue signal from line 26 as equals the green signal from line 25. That does not affect the color of opaque FG objects, since their blue content has been assumed not to exceed the green content.

Also, control signal $E_c$ then directly equals $B_o$—G, where $B_o$ represents the output from limiter 76, and G represents the green component signal on line 25. That control signal distinguishes effectively between points of the blue backing and points of the FG scene itself. At any point of the backing the control signal has the full value $B_o$, while for any opaque object of the FG scene the control signal is zero, since the blue content has been assumed not to exceed the green content. Hence for such objects, the BG gating action of circuit 70 essentially switches the BG color signals between full transmission to mixer 50 when backing 10 is being scanned, and full suppression when a FG object is being scanned. Thus there is zero superposition of the BG scene on any opaque object of the FG scene, zero veiling of the BG scene by blue derived from backing 10, and fully correct color reproduction of both the FG and BG objects.

With the same assumptions as to FG colors, the present system reproduces correctly most objects of the FG that are partially transparent, or are blurred by motion, which causes essentially the same effect as partial transparency of a stationary object. For example, a fully illuminated white FG object that is 50 percent transparent will reflect equal amounts of blue, green and red, but only at half the intensity that would result from an opaque white object. The green and red component signals from such an object are therefore half the normal maximum. The blue component signal has the full maximum value, half resulting from blue light reflected by the object, and half resulting from blue light from the backing, transmitted to the extent of 50 percent by the object. That blue signal is reduced by limiter 60 to the same level as the green signal, so that the total contribution from the FG scene to mixer 50 represents white light at the intensity actually reflected by the object. The BG color signals are also reduced by 50 percent, since control signal $E_c=B_o$—G has half its maximum value. That result follows from setting of limiter 76 to make $B_o$ equal to the full normal blue reflection from an opaque white FG object, which makes the green reflection G from the present partially transparent object equal to half of $B_o$. The output of mixer 50 therefore correctly represents equal contributions from the FG and BG scenes.

A corresponding analysis shows that the system gives correct reproduction also for other degrees of transparency than 50 percent, and for all FG colors having an equal blue and green content. Such colors include not only the grey scale but also red, flesh tones, pinks and cyan. However, if the FG includes a color having a blue content much less than the green content, such as a highly saturated green or yellow, such colors will be somewhat distorted if they occur on transparent objects or at edges that are blurred by motion. For example, a green FG object with 50 percent transparency due to movement will reproduce as a rather dark cyan. At the blurred area the blue signal will correspond to half the brightness of the backing, seen through the moving object, and the green signal will also have half its normal value, producing cyan. The BG scene will not appear through that blurred edge, since the equal blue and green FG signals produce a BG control signal $E_c$=0. Fortunately, highly saturated colors, such as bright green and yellow, rarely occur in foreground objects and are ordinarily avoided as much as possible because of a tendency to appear fluorescent and unrealistic. Moreover, the described color distortion applies only to partially transparent objects or to edges that are blurred by motion. Since motion is usually transient the effect is not easily noticed. No corresponding distortion results, of course, if bright green or yellow occurs in the BG scene behind a blurred edge of a FG object of normal color.

The assumption made above that the FG objects contain no blue colors is not always feasible. Of particular significance are pastel blues, as in blue eyes. Such shades of blue are highly unsaturated, including a large content of white, and hence including green and red in appreciable and approximately equal amounts. The blue content of such pastel blues typically exceeds the green content by a factor of the order of 5 percent to 25 percent. All colors having that property are accommodated, in accordance with the present invention, by suitable biasing of the control circuits.

That biasing is typically represented in FIG. 1 by the biasing amplifier 64, which boosts the green signal relatively to the blue signal at the input both to limiter 60 of the FG control circuit and to difference circuit 74 of the BG control circuit. Considering first the FG control, the biasing action increases the level at which the blue signal is clipped by limiter 60 by the factor M, from the level of the green signal to M times that level, where M represents the gain of amplifier 64. If M=1.25, for example, a FG color containing 25 percent more blue than green will still be correctly reproduced, since limiter 60 will transmit the blue signal without reduction to mixer 50. Yet during scanning of blue backing 12 the resulting large blue signal is still reduced to zero by limiter 60, since the absence of any green light from the backing makes the clipping level zero. Since the described biasing action is independent of the red content, it provides correct reproduction of such colors as low saturated magenta which combine red with the described mutual proportions of blue and green.

Turning now to the gating of the BG scene, when biasing amplifier 64 is set for a gain of 1.25, as just described, difference circuit 74 produces a BG control signal $E_c$ equal to the excess of the blue signal over 1.25 times the green signal. Hence $E_c$ is zero for a light blue FG object, as well as for all other colors having a blue content no greater than 1.25 times the green content. Therefore such FG colors are reproduced without any superposition of light from the BG scene.

Application of the baising technique just described has the potential disadvantage of extending the range of FG colors that are subject to the color distortions, described above, which occur at blurred edges or otherwise partially transparent areas. The color range in which those distortions may be encountered is characterized mainly by a blue content much less than the green content. With bias amplifier set to a gain of 1.25, say, instead of unity, the ratio of blue to green at which such distortions may occur is increased correspondingly. It is emphasized, however, that distortions of this type are limited to blurred or otherwise semitransparent FG objects, and are also limited to types of colors that tend to be rarely used.

If it is desired to use colors containing much more green than blue for FG objects that will be subject to blurring, the tendency to color distortion can often be reduced by adjusting the gain of bias amplifier 64 to a value less than unity. That affects r^production of unblurred FG areas only if their blue content nearly equals the green content, and it is often possible to avoid such colors in a particular scene. Thus a judicious selection of color combinations and appropriate adjustment of the bias adjustment can usually reduce the described potential color distortion to negligible proportions.

In the above description it was initially assumed for clarity of discussion that the color magenta was excluded from the FG scene. As already mentioned, magentas of low saturation are correctly reproduced together with low saturation blues by suitable adjustment of bias amplifier 64. If it is desired to include brilliant or highly saturated magenta in a particular scene, switch 66 is shifted from the position shown in FIG. 1, making the control circuits for both FG and BG scenes subject to the FG red color component signal on line 24 in place of the green signal on line 25. The system then operates in a manner similar to that already described, except for substitution of red for green throughout, which includes the interchange of magenta and cyan. Many colors, including in particular pastel shades having a high white content, are reproduced equally well with switch 66 in either position. The fact that switch 66 is ordinarily preferred in the position illustrated is not due to any peculiarity of the system, but results from the greater relative frequency of occurrence and use of colors related to cyan (blue plus green) as compared to colors related to magenta (blue plus red).

Many circuit details which would be included in a practical system have been omitted from FIG. 1 for clarity of illustration. Such features include, for example, optical and electronic filters, biasing and clipping circuits, phase control devices for maintaining proper phase relations among the various signals, and variable gain amplifiers for such purposes as adjusting the effective contrast or gamma of the various color components, equalizing circuit gain, compensating filter losses, and compensating the relative spectral sensitivity of photographic emulsions or of the output cathode ray tube. Such amplifiers may be designed in known manner to produce a nonlinear response, as to compensate photographic effects at the toe portions of the characteristic curve of a photographic emulsion. Signal controls of such types are well known, in and of themselves, and can be provided as needed to meet the requirements of any particular system.

It will be understood without detailed discussion that the color component video signals for the FG scene and for the BG scene can be developed in any desired manner. In particular, the FG scene 10 can be photographed with an illuminated backing 12, and the resulting motion picture film can then be scanned by mechanism such as that represented in FIG. 1 at 30 in synchronism with whatever mechanism is used for recording the BG scene. Also, the BG scene may be recorded directly by a television camera that is suitably synchronized with the mechanism that records the FG scene.

When the composite picture is to be shown on television, it is usually preferred to record the FG scene live with a TV camera, as represented in FIG. 1, and to insert the BG scene either from a previously prepared motion picture film, as in FIG. 1, or from a video tape recording of a BG scene. In the latter case the synchronization of the camera and video tape reproducer may be controlled by a signal derived from either of those units, which then may be considered to incorporate control unit 40 of FIG. 1. Alternatively, both the FG and BG scenes may be scanned live by respective television cameras, so that whatever scene the BG camera surveys becomes an inserted live background scene, and the output from mixer 50 provides a composite of two live scenes. Cathode ray tube 58 of FIG. 1 represents primarily a monitor display tube, but is intended also to represent any desired type of TV output equipment, such, for example, as a video recorder or a TV broadcasting station.

When the composite picture is intended primarily for exhibition as a motion picture, it will often be convenient to prepare first a motion picture recording of the BG scene. The FG scene may then be photographed with a motion picture camera against an illuminated backing. During that process, a TV camera may be mounted in a manner to record simultaneously the FG scene. For example, light from FG scene 10 and its backing 12 may be divided by a partially reflecting mirror 82 to supply equivalent beams to a motion picture at camera 80 and to TV camera 20 and its associated apparatus as shown in FIG. 1 for simultaneously producing a composite picture with the previously photographed BG scene. That composite picture can be displayed on a monitor, such as CRT 58 of FIG. 1, for guidance of the camera man or director during the photography of the FG scene. The, as a separate step, the motion picture films of the FG and BG scenes may be composited either by known photographic techniques, or by employing the present invention.

The composite color picture represented by the video signals produced by mixer 50 on lines 54, 55 and 56 can be recorded on motion picture film in many different ways For example, the face of color cathode ray tube 58 in FIG. 1 may be imaged on an unexposed photographic color film, much as the face of tube 34 is imaged on film 32. However, a higher resolution is usually obtainable with a CRT having a white light phosphor. FIG. 2 represents schematically an illustrative system for recording color video signals on a color motion picture film by means of such a high resolution CRT. Modification of that system to replace the color film by three-color separation records on black and white film will be evident to those skilled in the art.

In FIG. 2 the input signals to mixer 50 on lines 24, 25 and 62 from the FG scene and on lines *44a*, *45a* and *46a* from the BG scene are typically developed from previously prepared motion pictures or video recordings and are gated by mechanism which is typically as described in connection with FIG. 1. Thus the portion of the system of FIG. 2 not explicitly shown is typically the same as in FIG. 1 except that TV camera 20 of the latter figure is replaced by suitable mechanism for scanning a FG film. That mechanism may be a flying spot scanner similar to BG film scanner 30 of FIG. 1.

Cathode ray tube 100 of FIG. 2 is a high resolution tube with white light phosphor and includes scanning mechanism synchronized by a scan control signal received on the line 96 from control unit *40a*. That unit corresponds generally to control unit 40 of FIG. 1, but includes additional functions. The video signal for controlling the beam intensity of CRT 100 is supplied via the line 92 from the switching mechanism represented at 90. Mechanism 90 comprises switching means of any suitable type for transmitting to output line 92 a selected one of the three-color component composite video signals received on the respective lines 54, 55 and 56 from mixer 50, in accordance with a color control signal supplied via the line 94 from control unit *40a*. That switching can be performed, for example, by a rotary switch under control of a stepper drive, by conventional relays, or by solid state electronic-switching circuitry of conventional type The color control signal on line 94, which may comprise several distinct signals on respective lines, has such time relation to the scan control signals on lines 22, 36 and 96 that successive complete scans of the picture area of tube 100 are controlled sequentially by the component video signals for the respective colors.

The apparent color of the face of tube 100 is shifted in synchronism with color selector 90, as by the color filter wheel represented at 102, which comprises sectors of filter material of the respective colors. Wheel 102 is indexed by stepping mechanism 103 in response to a color control signal on line 105. That signal is shown as being derived from the line 94 to emphasize that the color control signals on lines 94 and 105 are coordinated in time, through in practice control unit 40*a* may be designed to develop separate color control signals for selector 90 and for color wheel 102.

The face of CRT 100 is imaged by the lens 107 on the unexposed color motion picture film 104. That film is advanced frame by frame by the intermittent movement 106 under control of a synchronizing signal received on the line 108 from control unit 40*a*. That signal may be derived from line 33, as shown, since it is related in time to the control signal supplied to intermittent movement 31 of FIG. 1. Control unit 40*a* is arranged to produce the three described types of control signal in suitable time relation so that the scanning mechanisms for the FG and BG scenes operate in synchronism with CRT 100. Following each complete scan of the picture area, a color control signal causes color selector 90 and color wheel 102 to shift the color delivered to film 104. And after each complete sequence of three successive colors, film 104 is advanced to the next frame, with simultaneous advance of the film or other medium from which the FG and BG scenes are derived. Thus the exposure of each frame of color film 104 is built up of successively applied component exposures, each representing one of the color components of the composite picture.

When both FG and BG component signals are derived from recordings, rather than from live scenes, the combination of those signals to form a composite picture in accordance with the present invention need not be carried out in real time. Thus a system such as that of FIG. 2 can be operated at any convenient speed. The scanning pattern may include as many lines as desired, and the rate of scanning may be slowed to free the resolution from the usual limitation imposed by a finite bandwidth in the signal amplifiers and logic circuits.

When the FG or BG scene is derived from a photographic record, such as a motion picture film, either a positive or a negative record may be used. When scanning a negative photographic record, each video color component signal is typically inverted electronically to make it equivalent to a signal derived directly from a photographic positive. For rapid production of a motion picture composite color print for viewing "next day dailies," for example, it would often be convenient to use a color negative film as the FG record, a color positive film as the BG record and positive color raw stock for recording the composite picture.

I claim:

1. An electronic system for producing a composite color picture corresponding to a foreground scene and a background scene, said system comprising in combination color responsive means for electronically scanning simultaneously the foreground scene against an illuminated backing and the background scene to produce foreground and background sets of color component video signals corresponding to at least three distinct wavelength regions of the visible spectrum, the backing illumination being essentially confined to one of said wavelength regions, discriminating means responsive to the foreground color component video signals for said one wavelength region and for a selected one of the other wavelength regions, and acting to develop an electrical control signal that represents essentially the portion of the light received from the foreground scene that is derived from the backing, mixing means for electrically mixing foreground and background input signals for the respective wavelength regions to produce a set of composite output signals, gating means responsive to the control signal and acting to supply as background input signals to the mixing means a variable fraction of the respective background color component video signals, said variable fraction varying directly with said portion represented by the control signal, means for limiting the foreground color component video signal for said one wavelength region to a maximum value that varies directly with the foreground color component video signal for said selected wavelength region, means for supplying the limited foreground color component video signal and the other foreground color component signals as foreground input signals to the mixing means, and output means for utilizing the output signals from the mixing means as composite color component video signals for producing said composite color picture.

2. An electronic system as defined in claim 1, and in which said limiting means include means for producing a reference signal that represents essentially the product of the foreground color component video signal for said selected wavelength region and a factor that is normally greater than unity, and means for limiting the maximum value of the foreground color component video signal for said one wavelength region to the reference signal.

3. An electronic system as defined in claim 2, and including also means for adjustably varying the value of said factor.

4. An electronic system as defined in claim 1, and in which said discriminating means include means for producing a reference signal that represents essentially the product of the foreground color component video signal for said selected wavelength region and a factor that is normally greater than unity, and said control signal equals essentially the excess of the foreground color component video signal for said one wavelength region over the reference signal.

5. An electronic system as defined in claim 1, and in which said output means comprise means for utilizing said output signals as composite color component video signals for producing a composite television picture.

6. An electronic system as defined in claim 1, and in which said output means comprise means for utilizing said output signals as composite color component video signals for producing a composite motion picture film.

7. An electronic system as defined in claim 1, and in which said foreground scene with its backing and the background scene comprise respective color motion picture films, said scene-scanning means act to scan the motion picture films in synchronism frame by frame, scanning each frame successively once for each wavelength region, and said output means comprise means for producing a light beam and for causing the light beam to scan distinct photograph motion picture emulsions for the respective wavelength regions to expose the emulsions frame by frame in synchronism with the scene-scanning means, means for varying the intensity of the light beam under control of the corresponding output signal as composite color component video signal during each scan, and means for processing the exposed emulsions to produce a composite color motion picture.

8. An electronic system as defined in claim 7, and in which said emulsions comprise respective layers of a color film.

9. An electronic system as defined in claim 7, and in which said emulsions are emulsions of respective black and white photographic films, and the exposed and developed emulsions represent color separation records.

10. An electronic system for producing a composite color motion picture film corresponding to a foreground color motion picture film carrying a foreground scene photographed before a blue backing, and a background color motion picture film carrying a background scene, said system comprising in combination color responsive means for electronically scanning simultaneously the foreground film and the background film frame by frame to produce foreground and background sets of color component video signals corresponding to the blue, green and red color components, respectively, mixing means for electrically mixing foreground and background input signals for the respective color components to produce a set of composite output signals, limiting means acting to limit the foreground blue signal to a maximum value that varies with the foreground green signal, and to supply the limited foreground blue signal and the foreground green and red signals as foreground input signals to the mixing means, gating means responsive to the foreground blue and green signals and acting to supply as background input signals to the mixing means a variable fraction of the respective background color component video signals, said fraction corresponding to the excess of the foreground blue signal over a selected function of the foreground green signal, and means for utilizing the output signals from the mixing means as composite color component video signals for producing a composite color motion picture film.

11. A system as defined in claim 10, and in which said limiting means act to limit the foreground blue signal to a maximum value substantially equal to the product of the foreground green signal and a selected factor.

12. A system as defined in claim 11, and in which said selected factor has a value between unity and about 1.5.

13. A system as defined in claim 10, and in which said gating means comprise means for developing a control signal representing the excess of the foreground blue signal over the product of the foreground green signal and a selected factor having a value between unity and about 1.5, means for effectively multiplying the background color component signals by a fraction that varies directly with the control signal and is zero for zero value of the control signal, and means for supplying the resulting background color component signals as background input signals to the mixing means.

14. An electronic system for producing a composite color picture corresponding to a foreground scene and a background scene, said system comprising in combination means for producing foreground color component video signals that correspond to the blue, green and red components of the foreground scene with a blue backing, means for producing background video signals that are synchronized with the foreground video signals and represent the background scene, discriminating means responsive to the foreground blue and green signals for producing an output that represents the degree to which the blue backing is concealed by the foreground scene, gating means for attenuating the background video signals in accordance with the output of the discriminating means, means for modifying the foreground blue signal to substantially eliminate the portion thereof due to light from the blue backing, and means for combining the modified foreground blue signal, the foreground green and red signals and the modified background video signals to produce the composite color picture.

15. In combination with a motion picture camera and an illuminated blue backing at a distance therefrom sufficient to accommodate a foreground scene and filling the entire field of view of the camera not occupied by the foreground scene, a television camera mounted with respect to the motion picture camera with the fields of view of the cameras essentially coinciding and including means for producing a set of foreground color component video signals corresponding to the blue, green and red color components of the foreground scene and blue backing, means for producing a corresponding set of background color component video signals synchronized with said foreground signals and corresponding to the blue, green and red color components of a selected background scene, means for attenuating the background color component video signals under control of the foreground color component video signals substantially in accordance with the degree to which the foreground scene effectively obscures the blue backing, means for limiting the foreground blue video signal to substantially eliminate the portion thereof due to light from the blue backing, electronic means responsive to the attenuated background signals, the limited blue foreground signal and the foreground green and red color component video signals and acting to produce a set of composite color component video signals corresponding to a composite of the foreground scene and the selected background scene, and electronic display means for displaying in real time the composite picture represented by the set of composite video signals.

16. The method of producing a composite motion picture corresponding to a foreground scene and a selected background scene, said method comprising photographing with a color motion picture camera the foreground scene before a blue backing, to produce a photographic foreground record, simultaneously operating a color television camera with essentially the same field of view as the motion picture camera to produce a set of foreground color component video signals, modifying the foreground signals to substantially eliminate the portion thereof due to light from the blue backing, producing a corresponding set of background color component video signals synchronized with the foreground video signals and representing the selected background scene, mixing the modified foreground signals and a portion of the background signals that corresponds substantially to the effective transparency of the foreground scene to produce a set of composite color component video signals, producing electronically under control of the composite video signals and in synchronism therewith a visible composite picture corresponding to the foreground scene that is in the common field of view of the cameras and the selected background scene, utilizing the visible composite picture as a guide in photographing the foreground scene, and combining the resulting photographic foreground record with the selected background scene to produce the composite motion picture.